T. A. Barrell,
Portable Store Room.
No. 110,538. Patented Dec. 27, 1870.
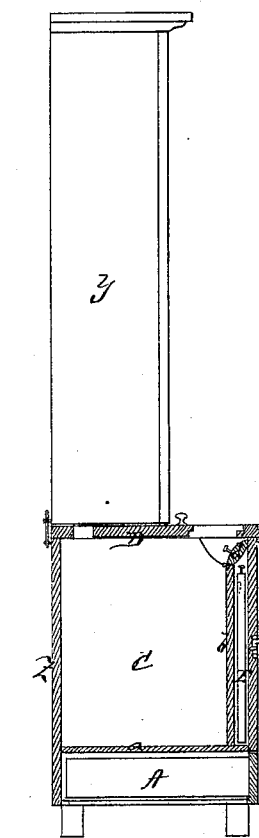
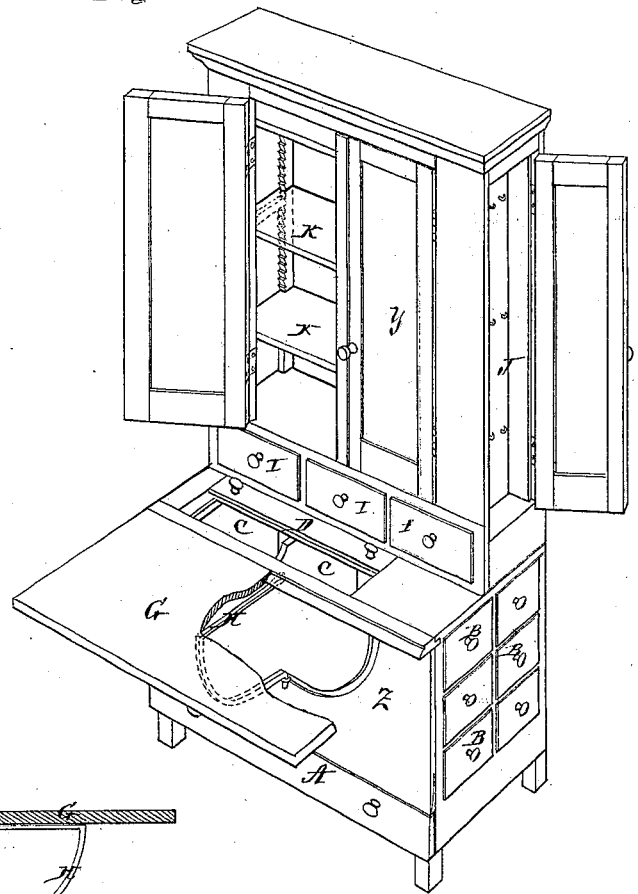

United States Patent Office.

THOMAS A. BARRELL, OF MAROA, ILLINOIS, ASSIGNOR TO HIMSELF AND WILLIAM H. AUSTIN, OF SAME PLACE.

Letters Patent No. 110,538, dated December 27, 1870.

IMPROVEMENT IN PORTABLE STORE-ROOMS AND PANTRIES.

The Schedule referred to in these Letters Patent and making part of the same.

*To all whom it may concern:*

Be it known that I, THOMAS A. BARRELL, of Maroa, in the county of Macon and in the State of Illinois, have invented certain new and useful Improvements in Combined Portable Store-Room, Pantry, &c.; and do hereby declare that the following is a full, clear, and exact description thereof, reference being had to the accompanying drawing and to the letters of reference marked thereon making a part of this specification.

The nature of my invention consists in the construction and arrangement, in a convenient and portable form, of a "combined store-room, pantry, and case of drawers" in one article of household furniture, occupying no more space on the floor than the ordinary safe or cupboard, affording ample room for two hundred pounds of flour and all the apparatus for mixing bread and cake, with the necessary spices and flavoring extracts; with room for all the tableware, including knives and forks, dishes of all kinds, table-cloths, napkins and rings, and a separate apartment for tea-towels and wiping-cloths, drawers for bread, cake, &c., as hereinafter specified, the whole occupying only a space of about twenty by forty inches on the floor and seven feet in height.

In order to enable others skilled in the art to which my invention appertains to make and use the same, I will now proceed to describe its construction and arrangement, referring to the annexed drawing, in which—

Figure 1 is a perspective view, and
Figure 2, an end view, part in section.

Z represents an oblong box or chest about twenty by forty inches on the floor, and thirty inches high, resting upon legs, as shown, and provided with a cupboard, Y, above.

In the bottom of the chest Z is a drawer, A, going in from front the entire length and width of the chest.

Above this drawer is a horizontal partition, *a*, as shown in fig. 2.

In one end of the chest is a number of drawers B B, for various purposes, extending inward for a suitable distance.

The remaining portion of the chest being divided into two bins or compartments, C C, for flour and meal, with a sliding lid, D, which can be moved backward under the cupboard Y.

The bins C C do not extend entirely to the front of the chest, but only to a vertical partition, *b*, which is placed far enough inside of the front of the chest to admit in the space thus formed the cake-board E, said space being closed at top, under the sliding lid D, by a small lid or cover, *d*, as shown.

At the upper front edge of the chest is hinged a table-leaf, G, which, when in use, is supported by the swinging bracket H.

When the leaf G is let down the bracket H fits in a recess on the front side of the chest.

In the lower part of the cupboard Y are drawers, I I, divided into compartments for various uses—knives, forks, spoons, &c.; and in one end of the cupboard is a compartment, J, with door, for dish-towels, rolling-pin, cake-cutters, &c., said compartment being provided with hooks for hanging up various articles.

The remaining part of the cupboard is provided with movable shelves, K K, and doors opening from the front.

The advantages and convenience of this "novelty combination" are too apparent to need any further mention.

Having thus fully described my invention,
What I claim as new, and desire to secure by Letters Patent, is—

The combination, in one article of household furniture, of the box or chest Z and cupboard Y, when their various parts are constructed and arranged substantially as shown and described, and for the purposes herein set forth.

In testimony that I claim the foregoing I have hereunto set my hand this 13th day of June, 1870.

THOMAS A. BARRELL.

Witnesses:
JOHN H. CROCKER,
H. E. KENT.